(12) United States Patent
Cepuran et al.

(10) Patent No.: US 9,338,731 B2
(45) Date of Patent: May 10, 2016

(54) VEHICLE TELEMATICS UNIT MANAGEMENT

(71) Applicant: General Motors LLC, Detroit, MI (US)

(72) Inventors: Lawrence D. Cepuran, Northville, MI (US); David George, Farmington Hills, MI (US); Mark J. Timm, Novi, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/739,135

(22) Filed: Jan. 11, 2013

(65) Prior Publication Data

US 2014/0199989 A1    Jul. 17, 2014

(51) Int. Cl.
*H04W 48/14* (2009.01)
*H04W 48/16* (2009.01)
*H04W 60/06* (2009.01)

(52) U.S. Cl.
CPC .............. *H04W 48/14* (2013.01); *H04W 48/16* (2013.01); *H04W 60/06* (2013.01)

(58) Field of Classification Search
CPC ......... H04W 8/18; H04W 8/20; H04W 8/205; H04W 8/22; H04W 8/245; H04W 8/26; H04W 8/265; H04W 48/02; H04W 48/18; H04W 4/00; H04W 4/001; H04W 52/02; G07C 5/008; H04L 67/125; H04L 12/12; H04M 3/42144; H04M 15/88; G06F 1/325; G06F 1/3209

USPC ........ 455/411, 418–420, 422.1, 432.3, 432.1, 455/456.4–456.6, 552.1
See application file for complete search history.

(56) References Cited

U.S. PATENT DOCUMENTS

| | | | |
|---|---|---|---|
| 8,554,189 B2 * | 10/2013 | Bruce et al. | 455/418 |
| 8,571,551 B1 * | 10/2013 | Bertz et al. | 455/435.1 |
| 2004/0203692 A1 * | 10/2004 | Schwinke et al. | 455/419 |
| 2008/0146202 A1 * | 6/2008 | Krause | 455/414.1 |
| 2009/0217348 A1 * | 8/2009 | Salmela et al. | 726/2 |
| 2010/0248695 A1 * | 9/2010 | Cepuran | 455/414.1 |
| 2011/0207463 A1 * | 8/2011 | Zoeckler et al. | 455/439 |
| 2013/0231087 A1 * | 9/2013 | O'Leary | 455/411 |
| 2013/0343285 A1 * | 12/2013 | Long et al. | 370/328 |

* cited by examiner

*Primary Examiner* — George Eng
*Assistant Examiner* — Umair Ahsan
(74) *Attorney, Agent, or Firm* — Christopher DeVries; Reising Ethingto P.C.

(57) ABSTRACT

A method and system for maintaining a wireless carrier system presence at a vehicle telematics unit in a vehicle includes placing the vehicle telematics unit in a quiescent mode that suspends its signal transmitting functions; instructing the vehicle telematics unit to periodically exit the quiescent mode and transmit a query that determines if the wireless carrier system used by a telematics service provider has changed; when the wireless carrier system has changed, receiving a new wireless profile associated with a new wireless carrier system; and storing the new wireless profile in a universal integrated circuit card (UICC) hardwired at the vehicle.

16 Claims, 2 Drawing Sheets

VEHICLE TELEMATICS UNIT MANAGEMENT

TECHNICAL FIELD

The present invention relates to wireless communications systems and more particularly to vehicle telematics units that use wireless communication systems.

BACKGROUND

Many vehicles currently carry vehicle telematics units that can wirelessly communicate over a wireless carrier system via cellular communications protocols. Generally speaking, the vehicle telematics units can be associated with a wireless carrier system so that the units can both place and receive voice/data calls over the wireless carrier system. In return for servicing the calls for the vehicle telematics unit, a vehicle owner may pay a monthly fee to the wireless carrier system. The vehicle telematics units of new vehicles are often delivered to owners ready to be used with the wireless carrier system or they can be activated with such a system soon after delivery. However, as time passes the vehicle owner may no longer want to maintain the service provided by the wireless carrier system. When this happens, the vehicle telematics unit can be prevented from placing or receiving calls to/from third parties yet retain a limited ability to communicate with the wireless carrier system or some other designated destination even though the vehicle owner no longer pays for service.

As the amount of time the vehicle telematics unit has been deactivated increases, so does the likelihood that the wireless carrier system on which the unit was previously activated no longer offers any service to the deactivated unit. That is, the wireless carrier system may remove the deactivated vehicle telematics unit from its register such that the system no longer recognizes the vehicle telematics unit on its equipment even if the unit later attempts to reengage the wireless carrier system. Or the wireless carrier system may go out of business entirely. Similarly, attempts to contact the vehicle telematics unit through the existing wireless carrier system may be unsuccessful. Thus, it may not be possible to wirelessly contact the vehicle telematics unit and reprovision the vehicle telematics unit at a later date.

SUMMARY

According to an embodiment of the invention, there is provided a method of maintaining a wireless carrier system presence at a vehicle telematics unit in a vehicle. The steps include placing the vehicle telematics unit in a quiescent mode that suspends its signal transmitting functions; instructing the vehicle telematics unit to periodically exit the quiescent mode and transmit a query that determines if the wireless carrier system used by a telematics service provider has changed; when the wireless carrier system has changed, receiving a new wireless profile associated with a new wireless carrier system; and storing the new wireless profile in a universal integrated circuit card (UICC) hardwired at the vehicle.

According to another embodiment of the invention, there is provided a method of maintaining a wireless carrier system presence at a vehicle telematics unit in a vehicle. The steps include attempting to contact the vehicle telematics unit to store a new wireless profile associated with a new wireless carrier system; determining that the vehicle telematics unit has been placed in a quiescent mode that suspends the signal transmitting functions of the vehicle telematics unit; stopping attempts to contact the vehicle telematics unit until the vehicle telematics unit exits the quiescent mode and sends a query to a central facility; when the wireless carrier system has changed, transmitting a new wireless profile associated with a new wireless carrier system to the vehicle telematics unit after receiving the query; and directing the vehicle telematics unit to store the new wireless profile in a universal integrated circuit card (UICC) hardwired at the vehicle.

According to yet another embodiment of the invention, there is provided a system of maintaining a wireless carrier system presence at a vehicle telematics unit in a vehicle that includes a vehicle telematics unit; and a subscriber identity module comprising a universal integrated circuit card (UICC) hardwired at the vehicle, wherein the UICC stores an existing wireless profile and is sized to accommodate additional wireless profiles, and the vehicle telematics unit is instructed to periodically exit a quiescent mode to transmit a query to determine whether a wireless carrier system that provides telematics subscription services has been changed.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
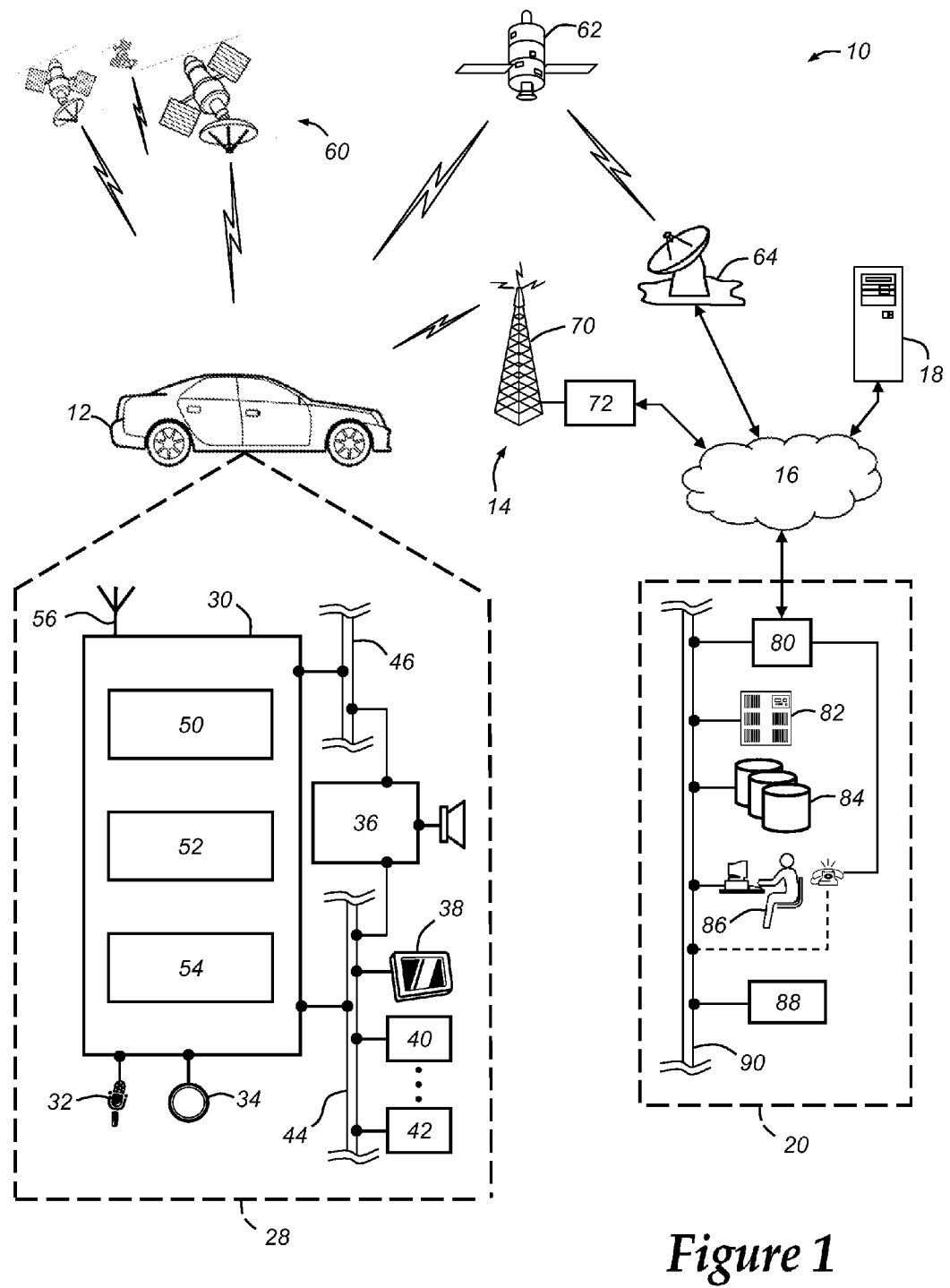
FIG. 1 is a block diagram depicting an embodiment of a communications system that is capable of utilizing the method disclosed herein.

The method and system described below involves vehicle telematics units that were once associated with a wireless carrier system but have since been deactivated. Once the vehicle telematics units have been deactivated, the wireless carrier system may remove those units from the accounting apparatus of its system. In the meantime, a number of events can occur. For example, the owner of a vehicle with a deactivated vehicle telematics unit may want to reactivate the unit with the wireless carrier system such that the system begins providing service again. To enable the reactivation of the vehicle telematics unit while it is deactivated, the unit may be called on to communicate in limited ways. This can be accomplished by placing/receiving calls to/from designated recipients, such as by using a number that is active in the home location register (HLR) of the wireless carrier system. That way, a user (e.g., a vehicle owner) can initiate an outbound communication from the vehicle to an operator who can facilitate the reactivation of the vehicle. Or a central facility, such as a call center, can initiate a reprogramming or reprovisioning of the vehicle telematics unit using the limited communication mechanism discussed above. Yet in some cases, the removal of the deactivated vehicle telematics unit from the wireless carrier system may end even the limited amount of communications afforded deactivated vehicle telematics units.

The wireless carrier systems servicing the vehicle telematics unit may be affiliated with or chosen by a vehicle telematics service provider. This affiliation can last for varying amounts of time, depending on the relationship that exists between the wireless carrier system and the telematics service provider. It is possible that the wireless carrier system affiliated with or used by the telematics service provider may change one or more times during the life of the vehicle. In that case, the vehicle telematics units that have been deactivated may be given a limited amount of time (e.g., six months, a year, etc.) to communicate with the telematics service provider via the existing wireless carrier system and obtain a wireless profile (i.e., wireless connection information) that can be used to connect to a new wireless carrier system before the existing wireless communication system erases the deactivated unit from its equipment. When the deactivated telematics unit fails to obtain the new wireless profile within the limited amount of time, the deactivated telematics unit may be rendered useless because the unit has then been left without information needed for connecting to the new wireless communication system.

In the past, such a situation could be remedied by the telematics service provider or the new wireless carrier system either of which would contact the vehicle telematics unit remotely and reprovision it (e.g., using over-the-air provisioning (OTAP)). However, vehicle telematics units that incorporate newer cellular standards and/or additional cellular standards may not be able to be so reached. For instance, if the vehicle telematics unit has been placed in a quiescent mode that suspends its signal transmitting functions (e.g., "airplane mode") a central facility may not be able to contact the unit.

To prevent deactivated vehicle telematics units from becoming unreachable, the units can each be instructed to determine when the unit has been placed in the quiescent mode and during that time periodically query the wireless carrier system and/or the central facility to determine if the wireless carrier system has changed. The period between queries can be variable (e.g., 3 months, 6 months, etc.). And at each query, if the vehicle telematics unit determines that the wireless carrier system is the same, then the unit can return to the quiescent mode. However, if the vehicle telematics unit detects that the wireless carrier system has changed, then the unit can contact the central facility and one or more new wireless profiles associated with the new wireless carrier system can be remotely sent and flashed onto a processor and/or memory of the unit, such as a universal integrated circuit card (UICC). In vehicle telematics units incorporating newer cellular standards and/or multiple cellular standards, the processor and/or memory may comprise UICCs.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
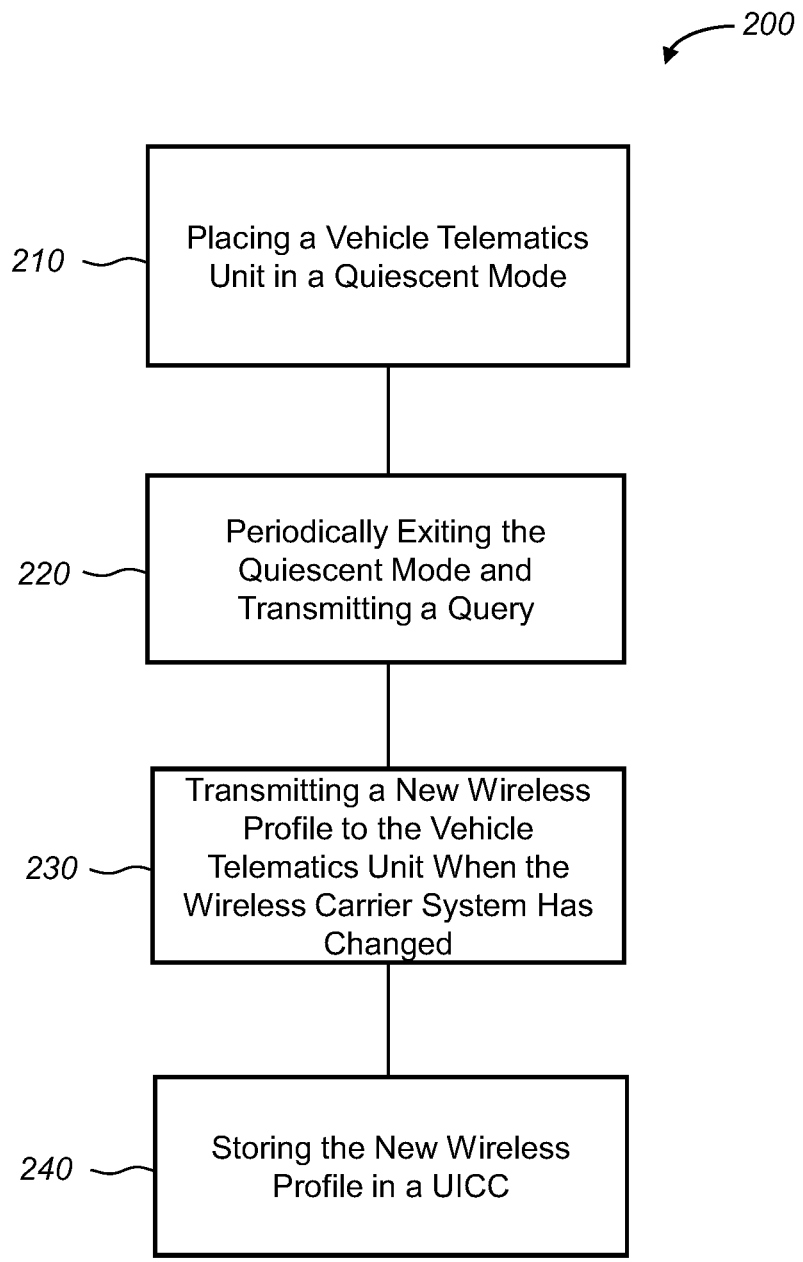
FIG. 2 is a flow chart of a method of maintaining a wireless carrier system presence at a vehicle telematics unit in a vehicle using the communications system.

Turning now to FIG. 2, there is shown a method 200 of maintaining a wireless carrier system presence at the vehicle telematics unit 30 in the vehicle 12. The method 200 begins by placing the vehicle telematics unit 30 in a quiescent mode that suspends its signal transmitting functions. For a variety of reasons, the vehicle telematics unit 30 can be placed in the quiescent mode, which can remove the unit 30 from the equipment used by the wireless carrier system 14 (e.g., the home location register (HLR)). This quiescent mode may also be referred to as an "airplane mode," which can permit the vehicle telematics unit 30 to carry out intra-vehicle tasks, such as monitoring VSMs 42 and/or recording diagnostic trouble codes (DTCs), but at the same time deactivate the wireless communications capabilities of the vehicle telematics unit 30. That is, the wireless carrier system 14 will not include the identity of the vehicle telematics unit 30 on its HLR. While in the quiescent mode, a central facility, such as a back office entity (e.g., computer 18) or the call center 20, may attempt to contact the vehicle telematics unit 30 and store a new wireless profile associated with a new wireless carrier system 14. The computer 18/call center 20 can be operated by a telematics service provider (or a telematics subscription service; these concepts are interchangeable) and, as discussed above, the telematics service provider may no longer use or plan to use the existing wireless carrier system 14. Telematics subscription services and telematics service providers are known to those skilled in the art.

When the telematics service provider changes wireless carrier systems 14, the central facility (computer 18/call center 20) can begin contacting vehicle telematics units 30—both units 30 that are recognized by the existing wireless carrier system 14 as well as those units 30 that are not. If the vehicle telematics unit 30 is recognized by the existing wireless carrier system 14, then the central facility can begin provisioning the vehicle telematics unit 30 with the new wireless profiles associated with the new wireless carrier system 14 or the central facility can begin a process by which a third party remotely provides the new wireless profile to the unit 30. Wireless profiles can include information used to connect with the wireless carrier system 14 in various ways, such as protocols for using different radio access technologies (RATs), the identities of equivalent home networks, the identities of roaming networks, and other information used to connect with the system 14. When the vehicle telematics unit 30 has been placed in the quiescent mode, the central facility may not be able to establish contact with the unit 30. When that occurs, the central facility can stop making attempts to contact the vehicle telematics unit 30 until the unit 30 exits the quiescent mode and sends a query to the central facility. After attempting to contact the vehicle telematics unit 30 and not receiving a response, the central facility can determine that the unit 30 is in a quiescent mode and wait for the unit 30 to query the central facility. This query will be discussed in greater detail below. The method 200 proceeds to step 220.

At step 220, the vehicle telematics unit 30 is instructed to periodically exit the quiescent mode and transmit a query that determines if the wireless carrier system 14 used by the telematics service provider has changed. To prevent the vehicle telematics unit 30 from becoming unreachable when the telematics service provider begins using a new wireless carrier system 14, the unit 30 can include an instruction to periodically override or defeat the quiescent mode for brief periods of time in order to contact the central facility and ask the central facility if the wireless carrier system 14 has changed. The instruction to periodically exit the quiescent mode can be stored at the vehicle telematics unit 30 while the vehicle 12 is being assembled at a vehicle manufacturing facility. Or it is also possible to wirelessly send the instruction to the vehicle telematics unit 30 after the vehicle 12 is manufactured in order to ensure that vehicles without this feature will include it. In one example, the owner of the vehicle 12 may allow a telematics subscription and/or the wireless services provided by the existing wireless carrier system 14 to lapse. When this occurs and the vehicle telematics unit 30 no longer is able to maintain a valid registration with the wireless carrier system 14, the unit 30 can place itself in the quiescent mode, wait for the instruction (generated at the vehicle 12) to periodically exit the quiescent mode, and then transmit the query each time the unit 30 exits the quiescent mode.

Or in another example, the central facility can determine that the vehicle telematics unit 30 is no longer associated with a telematics subscription and/or the wireless services provided by the existing wireless carrier system 14 are no longer being subscribed to by the vehicle owner. In that case, the central facility can wirelessly send an instruction to the vehicle telematics unit 30, which the unit 30 can save at the vehicle 12 and wait for a direction to periodically exit the quiescent mode. The vehicle telematics unit 30 can then transmit the query each time the unit 30 exits the quiescent mode.

If the vehicle telematics unit 30 does not periodically send such a query, it is possible that the telematics service provider could begin using a new wireless carrier system. Moreover, the existing wireless carrier system may only permit vehicle telematics units 30 access to its system for six months. And in the meantime the vehicle telematics unit 30 in the quiescent mode may not attempt any communications. If more than six months have passed, the vehicle telematics unit 30 may lack a new wireless profile for communicating via the new wireless carrier system 14. As a result, the central facility will not be able to communicate with the vehicle telematics unit 30 nor will the central facility be able to provide the new wireless profile. The method 200 proceeds to step 230.

At step 230, the new wireless profile associated with the new wireless carrier system 14 is transmitted to the vehicle telematics unit 30 when the wireless carrier system 14 has changed. The new wireless profile associated with a new wireless carrier system 14 can be received at the vehicle telematics unit 30 after the central facility receives the query. Receipt of the query at the central facility can serve as an alert that the vehicle telematics unit 30 has been in the quiescent mode but is now configured to receive the new wireless profile. The new wireless profile can be sent from the central facility to the vehicle telematics unit 30 where the new wireless profile can be flashed or saved onto a subscriber identity module (SIM) that includes the UICC. In other implementations, a third wireless carrier system can be used to carry out at least part of the method 200. For instance, it is possible that the third wireless carrier system can be tasked with transmitting the new wireless profile for the new wireless carrier system 14. The third wireless carrier system may only provide reprovisioning services for the new wireless carrier system 14 and may not be associated with the telematics service provider. That is, the third wireless carrier may be used for a limited purpose/duration—reprovisioning vehicle telematics units 30 for use on the new wireless carrier system 14 that is different from the third wireless carrier system 14. The method 200 proceeds to step 240.

At step 240, the new wireless profile is stored in the UICC hardwired at the vehicle 12. The vehicle telematics unit 30 can be directed to store the new wireless profile in the UICC. The UICC in this implementation can be soldered into the vehicle telematics unit 30 and upon receiving the new wireless profile at the unit 30, the new profile can be written/stored into the UICC. While the UICC can accept the new wireless profile, the UICC can also maintain the wireless profile(s) used by the existing wireless carrier system 14 as these profiles may not be able to be erased from the UICC. In this sense, it should be appreciated that the UICC has a finite amount of space for storing additional wireless profiles. In one example, the UICC can store wireless profiles for 2-3 wireless carrier systems 14 depending on the size of those profiles. It is possible that the UICC can be appropriately sized to accommodate not only the wireless profile of the existing wireless carrier system 14 but also the new wireless profile. It is also possible to provide room in the UICC for one or more additional wireless profiles beyond the existing wireless profile and the new wireless profile. Once the new wireless profile is stored, the vehicle telematics unit 30 can be instructed to return to the quiescent mode. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of maintaining a wireless carrier system presence at a vehicle telematics unit in a vehicle, the steps comprising:
 (a) placing the vehicle telematics unit in a quiescent mode that suspends its signal transmitting functions;
 (b) instructing the vehicle telematics unit to periodically exit the quiescent mode and transmit a query to a telematics service provider that asks if the telematics service provider has stopped providing services using a first wireless carrier system and begun providing services using a second wireless carrier system, wherein the first wireless carrier system and the second wireless carrier system each comprise a different cellular telephone system that includes a plurality of cell towers and one or more mobile switching centers and that operates to permit cellular communication of data between the vehicle telematics unit and the telematics service provider, and wherein the telematics service provider supplies subscription-based data and services to vehicles via the first wireless carrier system, the second wireless carrier system, or both;

(c) after a determination that the telematics service provider has stopped providing services using the first wireless carrier system and begun providing services using the second wireless carrier system, receiving a new wireless profile associated with the second wireless carrier system; and (d) storing the new wireless profile in a universal integrated circuit card (UICC) hardwired at the vehicle.

2. The method of claim 1, wherein the query is received by a central facility controlled by the telematics service provider.

3. The method of claim 1, wherein a central facility wirelessly provides the new wireless profile to the vehicle telematics unit.

4. The method of claim 1, wherein step (b) further comprises storing an instruction in the vehicle telematics unit at a vehicle manufacturing facility that causes the vehicle telematics unit to periodically exit the quiescent mode and transmit the query.

5. The method of claim 1, wherein step (b) further comprises transmitting an instruction from a central facility to the vehicle telematics unit that causes the vehicle telematics unit to periodically exit the quiescent mode and transmit the query.

6. The method of claim 1, wherein the amount of time between transmitting each query is less than one year.

7. The method of claim 1, further comprising the step of receiving the query at a central facility, wherein the receipt of the query alerts the central facility that the vehicle telematics unit has exited the quiescent mode and is configured to receive the new wireless profile.

8. The method of claim 1, further comprising the step of returning the vehicle telematics unit to the quiescent mode after storing the new wireless profile in the UICC.

9. A method of maintaining a wireless carrier system presence at a vehicle telematics unit in a vehicle, the method comprising:

(a) attempting to contact the vehicle telematics unit to store a new wireless profile associated with a second wireless carrier system, wherein the second wireless carrier is different from a previously used first wireless carrier system;

(b) determining that the vehicle telematics unit has been placed in a quiescent mode that suspends the signal transmitting functions of the vehicle telematics unit;

(c) stopping attempts to contact the vehicle telematics unit until the vehicle telematics unit exits the quiescent mode and sends a query to a telematics service provider inquiring about the second wireless carrier system;

(d) receiving the query from the vehicle telematics unit, wherein the query asks if the telematics service provider has stopped providing services using a first wireless carrier system and begun providing services using the second wireless carrier system;

(e) transmitting the new wireless profile associated with the second wireless carrier system to the vehicle telematics unit after receiving the query; and (f) directing the vehicle telematics unit to store the new wireless profile in a universal integrated circuit card (UICC) hardwired at the vehicle.

10. The method of claim 9, wherein steps (a)-(e) are carried out at the telematics service provider.

11. The method of claim 9, further comprising the step of storing an instruction at the vehicle telematics unit that causes the vehicle telematics unit to periodically exit the quiescent mode and transmit the query.

12. The method of claim 11, wherein the instruction specifies that the amount of time between transmitting each query is less than one year.

13. The method of claim 9, further comprising the step of transmitting an instruction from the central facility to the vehicle telematics unit that causes the vehicle telematics unit to periodically exit the quiescent mode and transmit the query.

14. The method of claim 9, wherein the receipt of the query alerts the central facility that the vehicle telematics unit has exited the quiescent mode and is configured to receive the new wireless profile.

15. The method of claim 9, further comprising the step of returning the vehicle telematics unit to the quiescent mode after storing the new wireless profile in the UICC.

16. A system for maintaining a wireless carrier system presence at a vehicle telematics unit in a vehicle comprising:
a vehicle telematics unit; and
a subscriber identity module comprising a universal integrated circuit card (UICC) hardwired at the vehicle, wherein the UICC stores an existing wireless profile and is sized to accommodate additional wireless profiles, wherein the vehicle telematics unit is placed in a quiescent mode that suspends its signal transmitting functions, wherein the vehicle telematics unit is instructed to periodically exit the quiescent mode to transmit a query to a telematics service provider that asks whether the telematics service provider has stopped providing services using a first wireless carrier system and begun providing services using a second wireless carrier system and receive a new wireless profile associated with the second wireless carrier system after a determination that the telematics service provider has stopped providing services using the first wireless carrier system and begun providing services using the second wireless carrier system, wherein the first wireless carrier system and the second wireless carrier system each comprise a different cellular telephone system that includes a plurality of cell towers and one or more mobile switching centers and that operates to permit cellular communication of data between the vehicle telematics unit and the telematics service provider, and wherein the telematics service provider supplies subscription-based data and services to vehicles via the first wireless carrier system, the second wireless carrier system, or both, and wherein the vehicle telematics unit stores the new wireless profile in the UICC.

* * * * *